(12) United States Patent
Jaeger

(10) Patent No.: US 10,900,827 B2
(45) Date of Patent: Jan. 26, 2021

(54) WEIGHT MONITORING SYSTEM FOR TENSIONED ATTACHMENT TO AN OBJECT SUPPORTED ABOVE A FOUNDATION

(71) Applicant: Herdstar, LLC, Mankato, MN (US)

(72) Inventor: Mark H. Jaeger, Madison Lake, MN (US)

(73) Assignee: Herdstar, LLC, Mankato, MN (US)

( * ) Notice: Subject to any disclaimer, the term of this patent is extended or adjusted under 35 U.S.C. 154(b) by 182 days.

(21) Appl. No.: 16/100,865

(22) Filed: Aug. 10, 2018

(65) Prior Publication Data

US 2018/0364092 A1 Dec. 20, 2018

Related U.S. Application Data

(63) Continuation of application No. 15/063,656, filed on Mar. 8, 2016, now Pat. No. 10,082,421, which is a continuation of application No. 14/076,675, filed on Nov. 11, 2013, now Pat. No. 9,310,243, which is a continuation of application No. 13/157,483, filed on Jun. 10, 2011, now Pat. No. 8,581,122, which is a continuation of application No. 12/109,841, filed on Apr. 25, 2008, now Pat. No. 7,980,129.

(60) Provisional application No. 60/913,961, filed on Apr. 25, 2007.

(51) Int. Cl.
*G01G 19/52* (2006.01)
*G01G 21/23* (2006.01)
*G01F 23/20* (2006.01)

(52) U.S. Cl.
CPC ............ *G01G 19/52* (2013.01); *G01F 23/20* (2013.01); *G01G 21/23* (2013.01); *Y10T 29/4973* (2015.01)

(58) Field of Classification Search
CPC ........ G01G 19/52; G01G 21/23; G01F 23/20; Y10F 29/4973
See application file for complete search history.

(56) References Cited

U.S. PATENT DOCUMENTS

| | | | |
|---|---|---|---|
| 3,376,537 A | 4/1968 | Pugnaire | |
| 4,004,647 A | 1/1977 | Forst et al. | |
| 4,044,920 A | 8/1977 | Swartzendruber | |
| 4,408,938 A * | 10/1983 | Maguire | F16B 13/126 411/181 |
| 4,530,245 A | 7/1985 | Jacobson | |
| 4,738,135 A | 4/1988 | Cadwell et al. | |
| 5,313,022 A | 5/1994 | Piroozmandi et al. | |

(Continued)

OTHER PUBLICATIONS

"Load Disc LD3™/LD360s™ Installation Manual", Kistler-Morse, 97-1137-01, Rev E, Feb. 2006.

*Primary Examiner* — Randy W Gibson
(74) *Attorney, Agent, or Firm* — Dicke, Billig & Czaja, PLLC

(57) ABSTRACT

A monitoring system functions both as a device for lifting the object and as a weighing system for monitoring or measuring the weight of an object, such as a feed bin. Various embodiments having a suspended load cell and methods of retrofitting the monitoring system to existing object are provided. Further, the accuracy provided by various embodiments enables one to accurately predict when the feed bin will be empty. Thus, the feed mill can be aware of anticipated needs days in advance, allowing the feed mill to better optimize its scheduling and deliveries.

23 Claims, 8 Drawing Sheets

(56) References Cited

U.S. PATENT DOCUMENTS

| | | | |
|---|---|---|---|
| 5,490,479 | A | 2/1996 | Shalev |
| 5,747,747 | A | 5/1998 | Cadou et al. |
| 5,764,522 | A | 6/1998 | Shalev |
| 5,770,823 | A | 6/1998 | Piroozmandi |
| 6,320,142 | B1 | 11/2001 | Burton et al. |
| 6,787,713 | B2 | 9/2004 | Kuechenmeister et al. |
| 6,981,649 | B2 | 1/2006 | Jaeger et al. |

* cited by examiner

WEIGHT MONITORING SYSTEM FOR TENSIONED ATTACHMENT TO AN OBJECT SUPPORTED ABOVE A FOUNDATION

RELATED APPLICATIONS

The present application is a continuation of U.S. patent application Ser. No. 15/063,656, filed Mar. 8, 2016, which is a continuation of U.S. patent application Ser. No. 14/076,675, filed Nov. 11, 2013, which is a continuation of U.S. patent application Ser. No. 13/157,483, filed Jun. 10, 2011, now U.S. Pat. No. 8,581,122, which is a continuation of U.S. patent application Ser. No. 12/109,841, filed Apr. 25, 2008, now U.S. Pat. No. 7,980,129, which claims the benefit of U.S. provisional application Ser. No. 60/913,961, filed Apr. 25, 2007, now expired, the disclosures of which are hereby incorporated by reference.

BACKGROUND

The disclosure relates generally to monitors for measuring the weight of an object, such as a feed bin, and methods of installing such monitors. More particularly, the disclosure relates to monitors having a suspended load cell that is positioned above a bottom of a leg of the object.

Many animal finishing facilities have bulk bins and automated feed delivery systems. In theory, these bins and delivery systems are intended to assure an uninterrupted flow of feed to the feeder. In reality, however, various known delivery systems result in varying disruptions of feed availability, which may have very serious consequences. For example, out-of-feed events can cause animal health problems, such as ulcers, particularly in pigs. Other potential health problems include, for example, cannibalistic tail biting and Hemorrhagic Bowel Syndrome, which is often fatal to the animal. Moreover, it is believed that even one out-of-feed event can have a prolonged negative effect on weight gain. Paid dividends can be directly affected as a result.

Out-of-feed events can be caused by a variety of causes. One notable cause is human error. Human errors are generally associated with empty bins, which occur when feed is not ordered, prepared, and delivered in a timely manner. Other causes of out-of-feed events include, for example, bridging and rat-holing of the feed. In these cases, the feed still remains in the bin, but does not flow to the delivery or auger system. As a result, even though feed is present in the bin, it is not delivered to the animals. When this occurs, the feed delivery system may shut down due to its extended run timers. No feed is then delivered until the feed delivery system is manually reset. If producers are not closely monitoring the feed delivery system, animals can be without feed for extended periods of time. While out-of-feed events can be prevented, in practice, they occur quite often.

One method of preventing out-of-feed events involves personally checking each bin by climbing up a ladder to the top of the bin and visually noting and monitoring the level of the bin. This method is labor-intensive and can be quite dangerous, especially in frigid, icy, or wet weather. To save time and avoid safety risks associated with climbing to the top of the bin, some workers have resorted to physically hitting the bin to estimate the level of the feed by listening to the sound reverberation. This method, however, does not provide the producer with very accurate information. It is also still labor-intensive because the worker has to personally check each individual bin. Further, as compared to the past, it is now more common for farms to be isolated from the workers. As a result, it takes more effort to check and monitor the feed systems. Therefore, the feed bins often are not checked frequently enough to prevent out-of-feed events because it takes too much time to check the bins, and, additionally, rush orders are often not fulfilled quickly enough.

Accordingly, electronic monitors have been devised to monitor feed levels. These known electronic monitors are equipped with compression load cells positioned on a concrete slab underneath the bin legs. The load cells measure the amount of the feed in the bin and are able to track the level and the changes in the feed weight, for example, from deliveries and consumption. Some of these known electronic monitors can make feed level data available to producers by telephone. Many producers choose not to implement these known systems, however, because they are costly and are difficult to retrofit to existing bins. Separate jacks or cranes are required so that the bin legs can be raised approximately 3-4 inches off of the concrete slab. Raising the bin disrupts the connections between the bins and the conveyor pipes that carry the feed from the bin to the feeding point. Known electronic feed bin monitors can also be unreliable because they are often susceptible to adverse affects on the accuracy of their measurements due to ice and foreign material under the supporting mechanisms. These supporting mechanisms include foot pads that are bolted to the concrete slab beneath the bin. Bolting the foot pads to the concrete slab introduces torques that can twist the load cell system enough to produce false readings at times.

Some other known systems are sonar or ultrasound based. One drawback of such systems is that they only report a feed level, not weight. As a result, these systems have difficulty maintaining accuracy when, for example, there is bridging or rat-holing of feed, there are significant changes in feed density, or there are temperature variations. All of these events can alter the correlation between feed level and the true amount or weight of feed. Known sonar or ultrasound based systems can also only provide level monitoring. Thus, they cannot accurately measure feed delivered or consumed by weight. The present invention addresses problems associated with the related art.

SUMMARY

According to various example embodiments, a bin monitoring system functions both as a device for lifting the bin and as a weighing system for monitoring or measuring the level of feed in a feed bin. Various embodiments having a suspended load cell and methods of retrofitting the bin monitoring system to existing bins are provided. Further, the accuracy provided by various embodiments enable one to accurately predict when the feed bin will be empty. Thus, the feed mill can be aware of anticipated needs days in advance, allowing the feed mill to better optimize its scheduling and deliveries.

One embodiment is directed to a feed bin monitoring system that has a suspended load cell that accurately measures the amount of feed going into and out of a feed bin having bin legs that support the bin above a foundation. The feed bin monitoring system of this embodiment can quickly detect if no feed is being consumed by the animals due to, for example, bridging of the feed in the bin. The feed bin monitoring system includes a frame configured to be securable to the foundation. A load cell is joined to the frame and is configured to measure a weight of the bin. A lifting mechanism is arranged to selectively lift the bin leg, thus applying the load to the load cell. Another aspect of the invention is directed to a method of monitoring an amount of feed in a feed bin having a plurality of bin legs by operatively connecting at least one feed bin monitor to each of the bin legs and transmitting data collected from the load cell to a display device.

Another aspect of this invention is directed to a method of installing a bin monitoring system, such as described above, to a leg of a feed bin. The method generally includes the steps of securing the bin monitoring system to at least one of the bin legs and using a bolt to raise the bin legs preferably no more than approximately 0.5 inches above the ground, thus facilitating retrofitting of existing bins.

Various embodiments may provide certain advantages. For instance, feed levels can be monitored easily and accurately so that out-of-feed events can be significantly reduced. Also, feeding animals with feed bins equipped with automatic bin monitoring systems reduces the need for expedited orders and allows feed producers to predict production needs in advance. Feed throughput may be improved, and feed transportation costs may be reduced. Further, the bin monitoring systems described herein can be retrofitted to existing bins easily and inexpensively, thereby reducing implementation costs.

Additional objects, advantages, and features will become apparent from the following description and the claims that follow, considered in conjunction with the accompanying drawings.

DETAILED DESCRIPTION

Figure 1A:
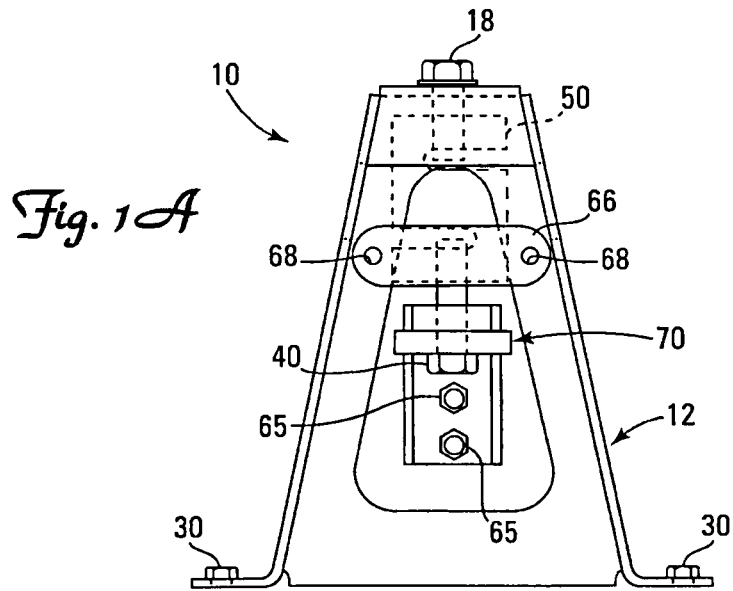
FIG. 1A is a front plan view of an embodiment of a bin monitoring system.

The following description of various embodiments implemented in the context of monitoring the volume or weight of feed bins and installing such monitoring systems is to be construed by way of illustration rather than limitation. This description is not intended to limit the invention or its applications or uses. For example, while various embodiments are described as being implemented in this context, it will be appreciated that the principles of the disclosure are applicable to other environments, as will be apparent to one of ordinary skill in the art.

In the following description, numerous specific details are set forth in order to provide a thorough understanding of various embodiments. It will be apparent to one skilled in the art that some embodiments may be practiced without some or all of these specific details. In other instances, well known components and process steps have not been described in detail.

Embodiments of the bin monitoring system are illustrated in FIGS. 1A-6. Referring now in particular to FIGS. 1A-3C and 6, a bin monitoring system 10 includes a frame 12. In some embodiments, the frame 12 is A-shaped and has a top 14 and two legs or supports 20a and 20b extending diagonally downward from the top 14. In the illustrated embodiments, each support 20a and 20b has a respective flange 24a and 24b with at least one respective flange aperture 28a and 28b for anchoring the frame 12 to a foundation such as a concrete slab C, as most bins are installed on concrete slabs. The top 14 includes a bolt aperture 16 that receives a bolt 18 for securing the frame 12 to the top of a load cell 50. In some embodiments, the frame 12 can be constructed of fabricated iron. Alternatively, the frame can be constructed of fabricated channel iron.

In some embodiments, the load cell 50 is implemented as an S-type load cell for measuring the tension or changing weight of a bin B. The bin monitoring system 10 incorporates the load cell 50 to measure the weight and changes of weight of the bin B. An example implementation of the load cell 50 is disclosed in U.S. patent application Ser. No. 11/422,910 of Jaeger et al., the teachings of which are herein incorporated by reference in their entirety. In some embodiments, the load cell 50 includes an electrical connection 52 having a wire that passes through an aperture 22 in one of the supports 20a and 20b to a transmitter (not shown) such that data collected from the load cell 50 can be accessed via a remote location such as, for example, by a wired, wireless, or mobile telephone or using a network such as the Internet.

It is further contemplated that the bin monitoring system 10 may be an element of a larger system in which the data transmitted may be compiled with other data, such as animal weights, so that multiple variables can be monitored and tracked in one central location. Such a larger system can also include, for example, a component for generating reports, such as a bin status report, a configuration report, an alarm settings report, a feed usage report, and a bin summary report. The bin status report may illustrate an image of a feed bin showing the current weight, alarm settings, and alarm conditions. The configuration report may list the configuration for the setup menu, interface menu, and computer port. The alarm settings report may list the alarm settings for each indicator. The feed usage report may list daily feed usage sorted by date and the total feed delivered for a selected date range. The bin summary report may list the current bin weights and any alarm conditions for the feed bins.

Figure 1B:
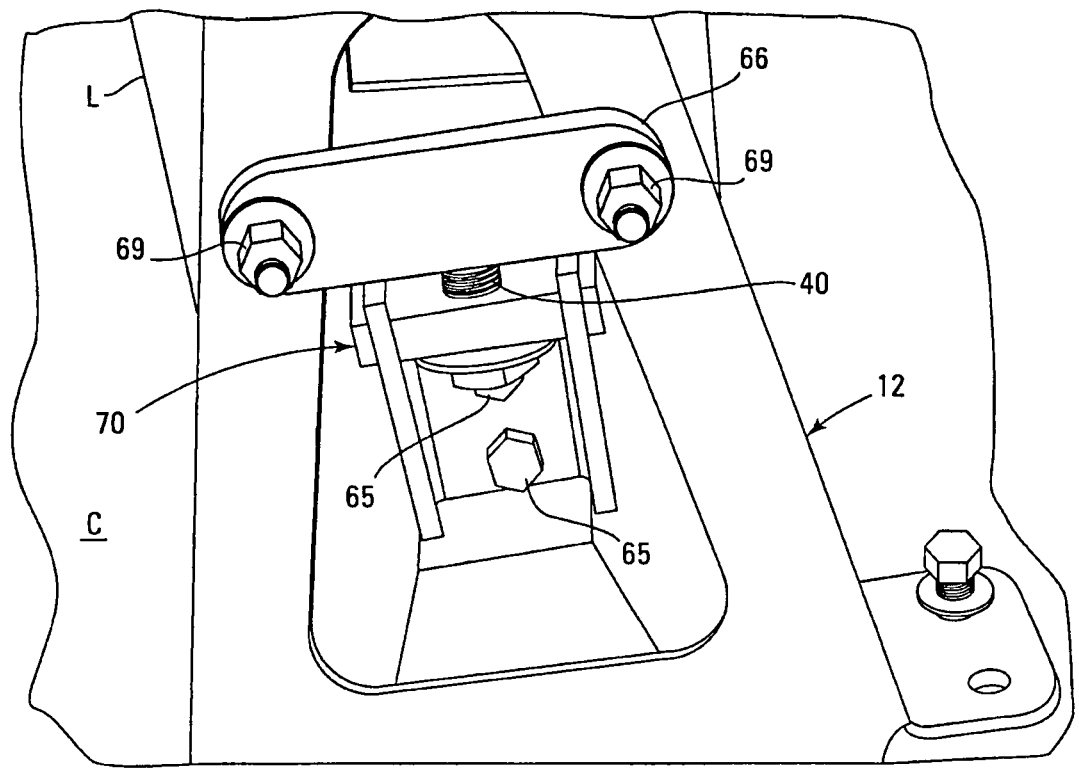
FIG. 1B is a front view of the bin monitoring system similar to that of FIG. 1A, wherein the bin monitoring system is operatively attached to a bin leg.
Figure 1C:
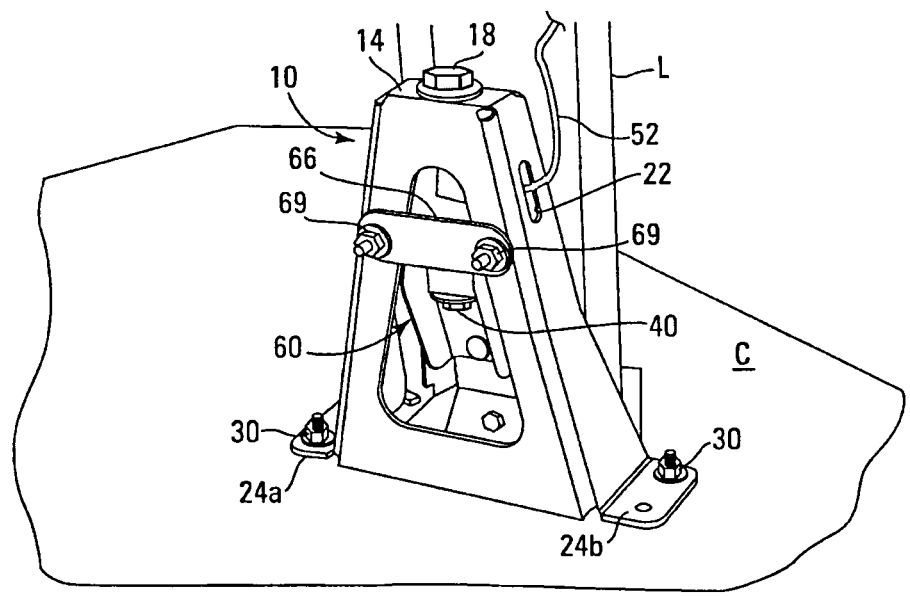
FIG. 1C is an enlarged, partial, perspective view of the bin monitoring system illustrated in FIG. 1B.
Figure 1D:
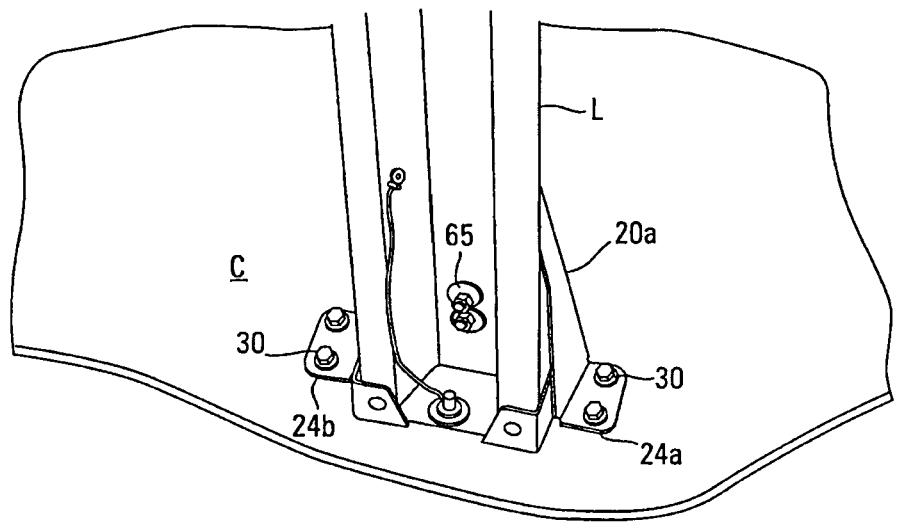
FIG. 1D is a rear view of the bin monitoring system of FIGS. 1B-1C operatively connected to the bin leg.
Figure 2A:
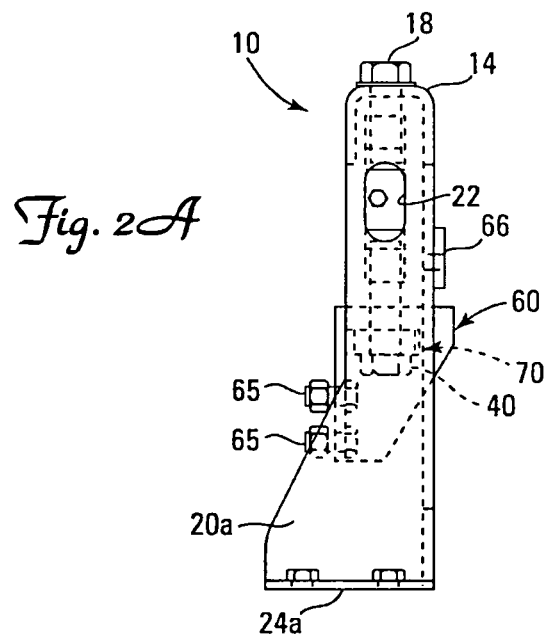
FIG. 2A is a side view of the bin monitoring system of FIG. 1A.
Figure 2B:
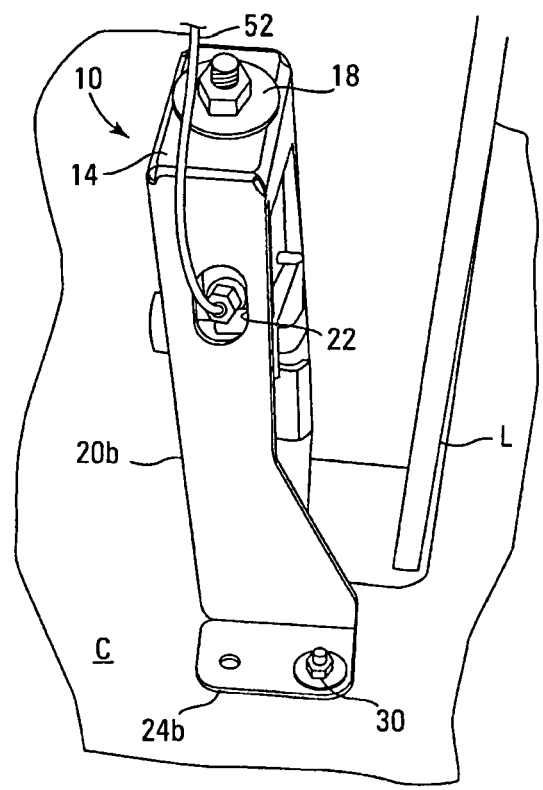
FIG. 2B is another side view of the bin monitoring system similar to that of FIGS. 1B-1D, wherein the bin monitoring system is operatively attached to the bin leg.
Figure 3A:
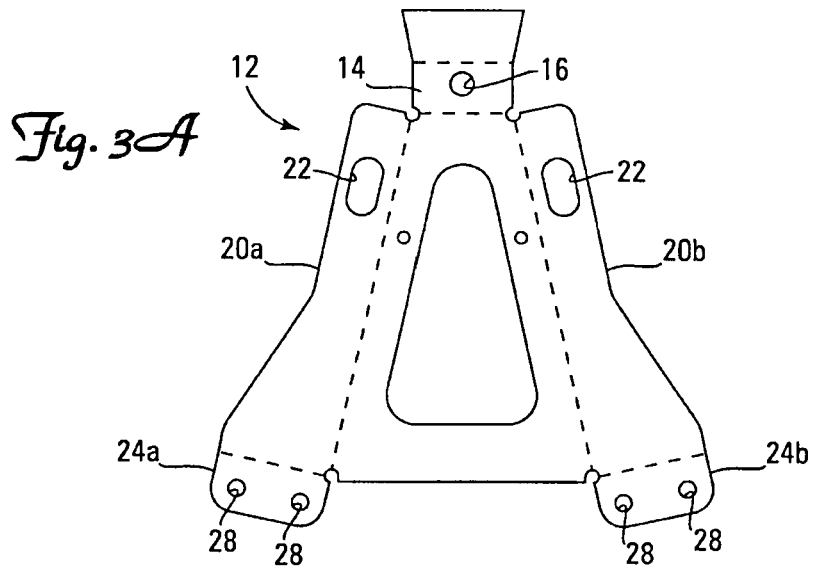
FIG. 3A is a front view of a frame of the bin monitoring system of FIG. 1A illustrating optional folding of the frame.
Figure 3B:
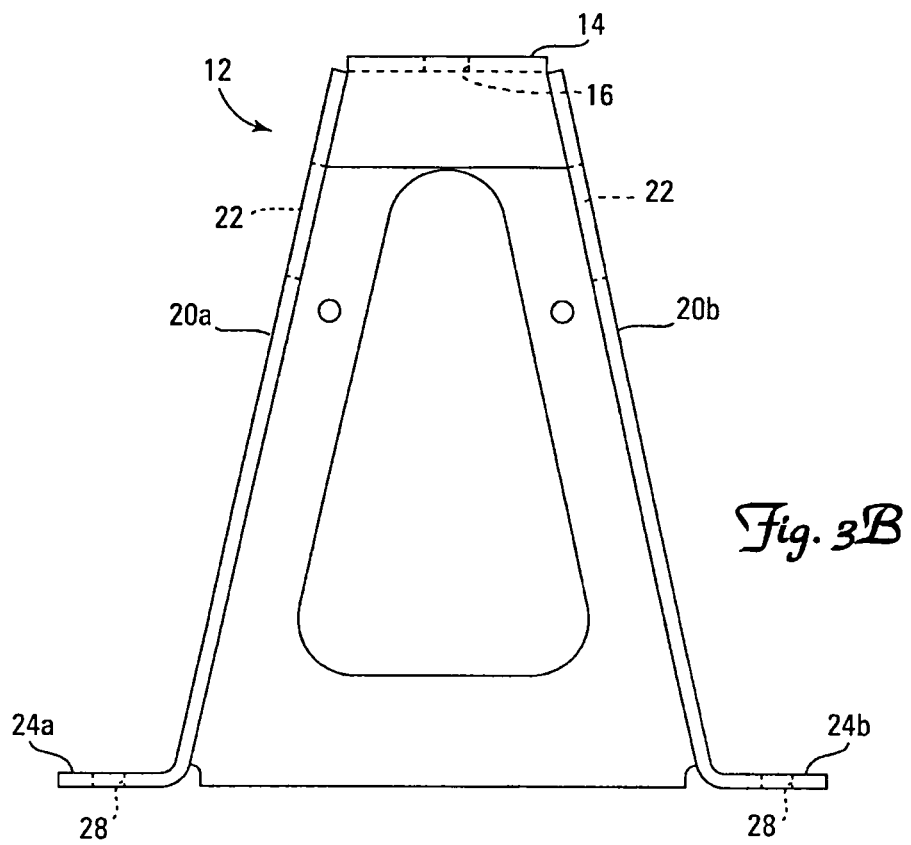
FIG. 3B is a plan view of the completed frame of FIG. 3A.
Figure 3C:
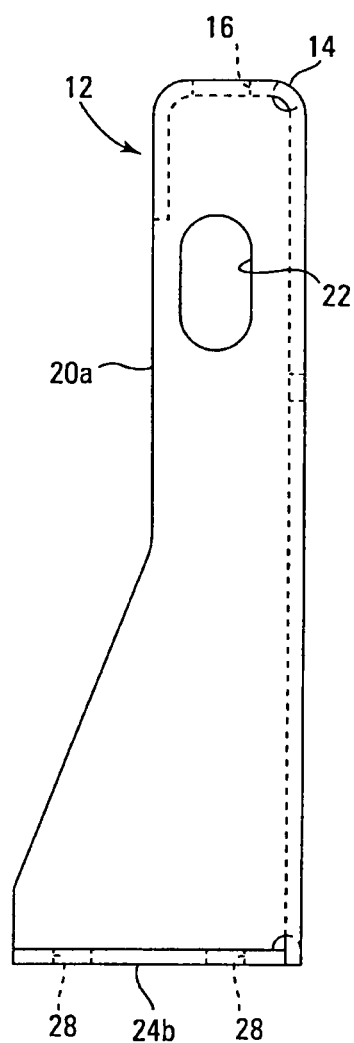
FIG. 3C is a side view of the frame of FIG. 3B.
Figure 4A:
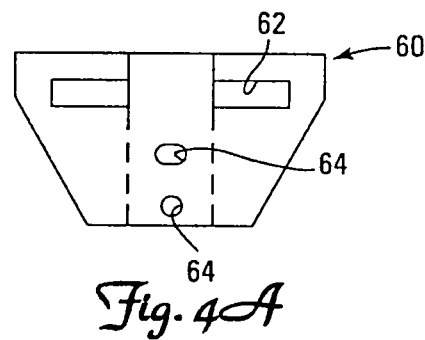
FIG. 4A is a plan view of a channel bracket of the bin monitoring system of FIG. 1A.
Figure 4B:
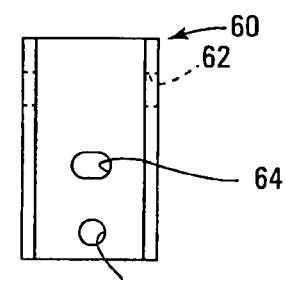
FIG. 4B is front view of the folded channel bracket of FIG. 4A.
Figure 4C:
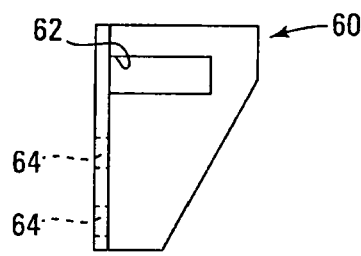
FIG. 4C is a side view of the completed channel bracket of FIG. 4B.
Figure 7:
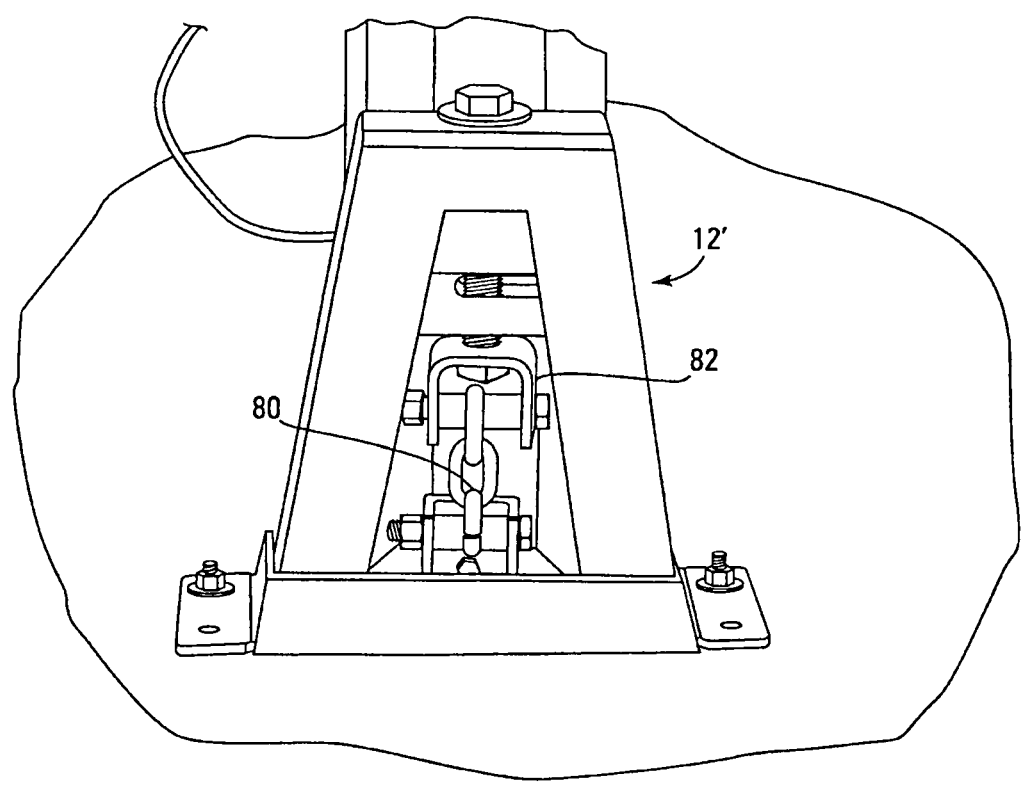
FIG. 7 illustrates another embodiment in which the channel bracket of FIG. 1A is replaced with an alternate mechanical connector including a chain link suspension.

Now also referring to FIGS. 4A-C, the bin monitoring system 10 additionally includes a mechanical connector, in this case a channel bracket 60, that is used to connect the bin monitoring system 10 to a leg L of the bin B. The channel bracket 60 may be generally U-shaped, being deeper at the top than at the bottom, to correspond to the shape of the bin leg L. In some embodiments, the bin monitoring system 10 includes a limiting mechanism 66 to restrict the upward movement of the channel bracket 60. The limiting mechanism 66 prevents the bin B from lifting and blowing over when, for example, there is a gust of wind and the bin B is empty. As shown, the limiting mechanism 66 may be a stop strap having bolt apertures 68 for use with a bolt 69 to secure the strap to the frame 12 as shown in FIGS. 1A-1C. The channel bracket 60 further includes a slot 62 for receiving and in some instances, supporting a load block 70 and is deep enough such that when the channel bracket 60 is bolted to the bin leg L and the frame 12 is secured to the concrete slab C, the channel bracket 60 extends beyond the stop strap 66, allowing it to contact and be restricted by the stop strap 66 when the bin B is lifted too high. This configuration is also illustrated in FIG. 2A. In alternative embodiments, the channel bracket 60 may be replaced with a chain link suspension or mechanical connector 80 attached to a clevis 82, as shown in FIG. 7, or another similar system.

Figure 5A:
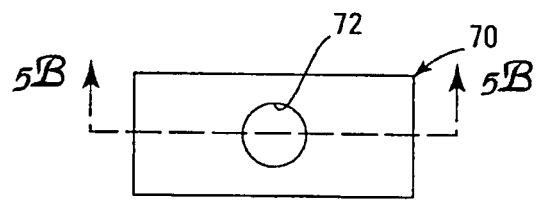
FIG. 5A is a top view of a load block of the bin monitoring system of FIG. 1A.
Figure 5B:
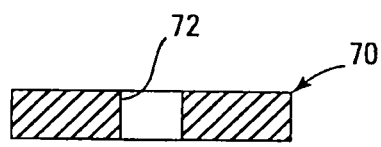
FIG. 5B is a cross-sectional, side view of the load block of FIG. 5A.
Figure 6:
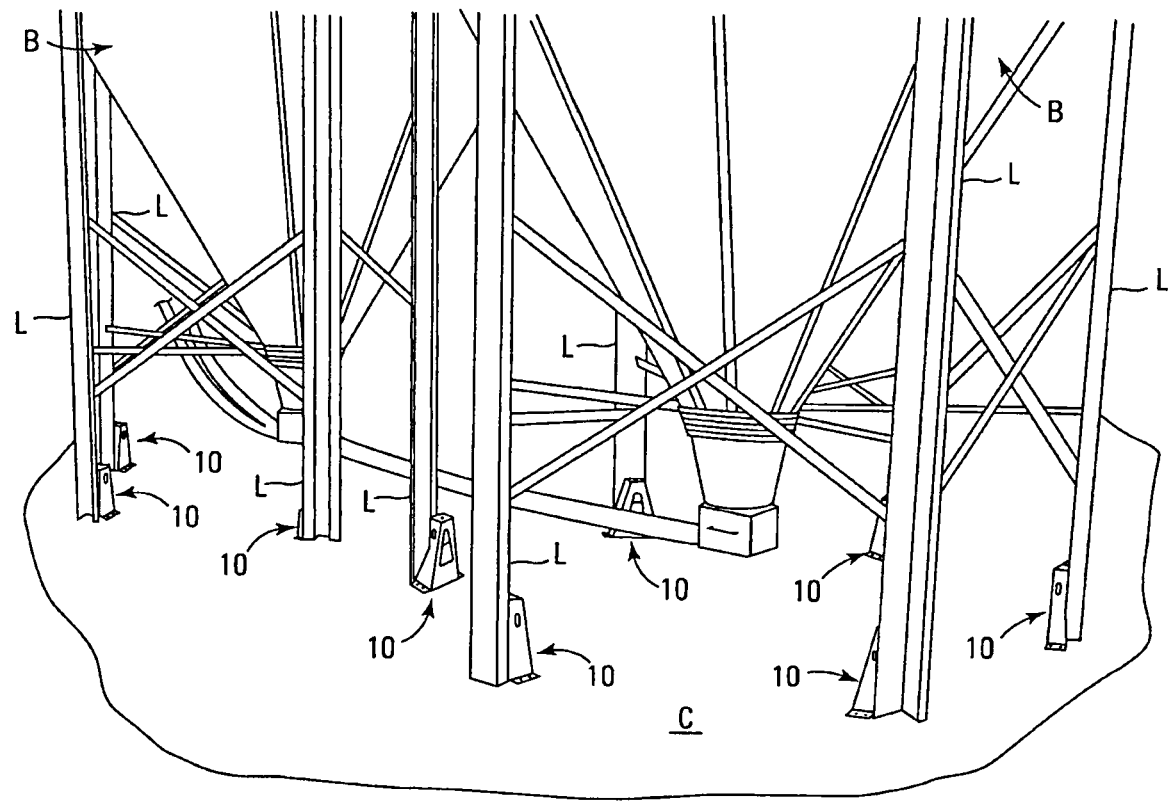
FIG. 6 is a view of a bin monitoring system attached to each leg of two adjacent bins according to another embodiment.

Now further referring to FIGS. 5A-5B, as previously mentioned, the bin monitoring system 10 further includes the load block 70, which is received within the slot 62 of the channel bracket 60 and is supported by the channel bracket 60 until the bracket 60 is elevated. The load block 70 is illustrated in FIGS. 5A-5B as having a bolt aperture 72. The load block 70 is placed in the slot 62 of the channel bracket 60. A threaded bolt 65 is then placed through a bolt aperture 72 of the load block 70 and threaded into the load cell 50. The load block 70 can move within the slot 62. This configuration allows for some misalignment of the channel bracket 60.

A typical feed bin has 4, 6, or 8 generally U-shaped legs. The bin monitoring system 10 may be placed alongside each leg L and bolted to the concrete slab C with an anchor bolt 30 through two of the flange apertures 28a and 28b. Two more bolts 65 may be pressed through the bolt holes 64 of the channel bracket 60 to connect the bin monitoring system 10 to the bin leg L.

As described above, the bin monitoring system 10 includes the threaded bolt 18, which secures the load cell 50 to the frame 12. According to various embodiments, the bolt 18 also serves as a jack to lift and support the load cell 50 when the load cell 50 is suspended off of the concrete slab C. In some embodiments, the bin monitoring system 10 jacks up the bin B no higher than about 0.75 inches, preferably no higher than about 0.5 inches above the concrete slab C. Because installing the bin monitoring system 10 does not require the bin B to be significantly lifted, existing bins may be retrofitted without having to empty the bin or disconnect flex augers and associated piping.

To install the bin monitoring system 10 according to one example method, the load cell 50, frame 12, and limiting mechanism 66 are operatively assembled. The footpads are then disconnected from the bin legs L. Next, two 0.5 inch holes are drilled into the bin legs L for the channel bracket 60. In the next step, the channel bracket 60 is first mounted adjacent the side of the leg L such that any space in between the channel bracket 60 and the leg L is reduced. Once the channel bracket 60 is attached adjacent the leg L, the frame 12 is aligned to the bin leg L and is secured with concrete anchor bolts 30. The channel bracket 60 is connected to a threaded load cell 50 by a threaded bolt 40 that can also function as a jack to lift the bin leg L. As the bolt 40 is rotated, e.g., seven times, the load cell 50 is moved upwards and correspondingly moves the bin leg L upwards. In the next step, a summing box or the transmitter (not shown) is mounted to the bin B and is operatively connected to the load cell(s) 50. Next, the summing box can be wired to the bin monitoring system 10. Next, wiring to the load cell 50 is secured to the bin support frame, e.g., using one or more cable ties. The bin monitoring system 10 is then connected to the on-site network to enable communication with a remote monitoring system. Next, preferably three of the bin legs L are electrically grounded above each frame using the anchor bolts.

As described above, the bin monitoring system 10 can be used to determine how much feed enters and exits a feed bin. In this way, the bin monitoring system 10 facilitates the determination of when more feed should be ordered. In addition, the bin monitoring system 10 facilitates verifying how much feed is actually delivered when the bins are refilled and how much is being consumed. As a result, potential out-of-feed events can be monitored, animal performance based on feed consumption can be correlated, and future bin levels can be predicted accurately.

As demonstrated by the foregoing discussion, various embodiments may provide certain benefits. For instance, the bin monitoring system 10 can greatly reduce monitoring costs. The required labor can be reduced because multiple bin feed levels can be quickly, simultaneously, and accurately monitored at a central location, as compared with the conventional approach of visually inspecting each bin individually. Safety hazards can also be reduced because workers do not need to climb feed bins to inspect them.

Additionally, logistical savings can be realized by the bin monitoring system 10. Typically, feed mills have large demands on Mondays and Fridays. On these days, the mills run over capacity and often need to pay overtime to drivers and milling employees to fill tanks for the weekend or to catch up and fill empty tanks on Mondays. On Tuesdays, Wednesdays, and Thursdays, the mills run under capacity. Use of the bin monitoring system 10 allow the feed mill to level its production flow out over the week by delivering feed early to some bins and just-in-time to others. Accurate monitoring of feed bins allows producers to better predict and schedule when they will need to replenish the feed bins, which in turn will reduce the amount of expedited orders and allow the feed mill to plan their production. By allowing the feed mill to better plan its production, the feed mill can schedule the bottlenecks to the maximum increasing throughput. Overtime is saved in both the feed mill and the trucking, and the incidence of empty compartments or "air tons" can be reduced. Rush orders can be eliminated by better planning, thus greatly reducing the frequency of expedited orders and the associated expense.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

Although the present invention has been described with reference to preferred embodiments, workers skilled in the art will recognize that changes can be made in form and detail without departing from the spirit and scope of the present invention.

What is claimed is:

1. A monitoring system useable with an object having a weight and at least one leg that supports the object above a foundation, the monitoring system comprising:

a combination of a frame, a mechanical connector securable to the leg of the object, a load cell mechanically coupled to each of the frame and the mechanical connector, and a threaded bolt adjustably positioned with respect to and interconnected to the combination;

in which the combination is configured to be securable to the foundation by at least one fixed anchor, and the monitoring system is configured such that rotation of the threaded bolt correspondingly lifts the object leg and applies a load of the leg to the load cell such that, in operation, the load cell is in tension.

2. The monitoring system of claim 1, in which the combination is configured to be secured to at least one of the foundation and the leg of the object prior to rotating the threaded bolt.

3. The monitoring system of claim 1, in which the load cell has upper and lower ends, and the upper end of the load cell is moveably mounted to the frame to allow the load cell to be raised and lowered relative to the frame.

4. The monitoring system of claim 1, in which the load cell is an S-type load cell.

5. The monitoring system of claim 1, in which:
the load cell includes a first threaded aperture to receive the threaded bolt;
the frame includes a bore adjacent the first threaded aperture; and
the threaded bolt extends through the bore in the frame and threadably engages the first threaded aperture in the load cell to secure the load cell to the frame and to lift and support the load cell when the threaded bolt is rotated.

6. The monitoring system of claim 5, in which the frame has an A-frame configuration with a top and a pair of frame legs, the bore being at the top of the frame and the frame legs of the A-frame are securable to the foundation.

7. The monitoring system of claim 1, further comprising a limiting mechanism that limits upward movement of the object leg.

8. The monitoring system of claim 1, in which the threaded bolt secures the load cell to the frame.

9. The monitoring system of claim 1, wherein the frame comprises a top with an aperture that receives the threaded bolt.

10. The monitoring system of claim 1, in which rotation of the threaded bolt lifts the connector relative to the load cell.

11. The monitoring system of claim 1, in which rotation of the threaded bolt lifts the load cell relative to the frame.

12. The monitoring system of claim 1, in which the threaded bolt is coupled to the load cell.

13. The monitoring system of claim 1, wherein the connector is coupled to the load cell.

14. The monitoring system of claim 1, in which the object leg has a bottom, the frame is configured to be securable to the foundation adjacent the object leg, and the load cell has upper and lower ends such that the load cell is operatively positioned to have the weight of the object applied to the lower end of the load cell; in which the monitoring system suspends the bottom of the object leg at an elevation below the load cell.

15. A monitoring system useable with an object having a weight and at least one leg that supports the object above a foundation, the monitoring system comprising:
a combination of a frame, a mechanical connector securable to the leg of the object, a S-type load cell mechanically coupled to each of the frame and the mechanical connector, and a threaded bolt adjustably positioned with respect to and interconnected to the combination;
in which the combination is configured to be securable to the foundation by at least one fixed anchor, and the monitoring system is configured such that rotation of the threaded bolt correspondingly lifts the object leg and applies a load of the leg to the load cell.

16. The monitoring system of claim 15, in which the combination is configured to be secured to at least one of the foundation and the leg of the object prior to rotating the threaded bolt.

17. The monitoring system of claim 15, in which the load cell has upper and lower ends, and the upper end of the load cell is moveably mounted to the frame to allow the load cell to be raised and lowered relative to the frame.

18. A monitoring system useable with an object having a weight and at least one leg that supports the object above a foundation, the monitoring system comprising:
a combination of a frame, a mechanical connector securable to the leg of the object, a load cell mechanically coupled to each of the frame and the mechanical connector, a threaded bolt adjustably positioned with respect to and interconnected to the combination, and a limiting mechanism that limits upward movement of the object leg;
in which the combination is configured to be securable to the foundation by at least one fixed anchor, and the monitoring system is configured such that rotation of the threaded bolt correspondingly lifts the object leg and applies a load of the leg to the load cell.

19. The monitoring system of claim 18, in which the combination is configured to be secured to at least one of the foundation and the leg of the object prior to rotating the threaded bolt.

20. The monitoring system of claim 18, in which the load cell has upper and lower ends, and the upper end of the load cell is moveably mounted to the frame to allow the load cell to be raised and lowered relative to the frame.

21. A monitoring system useable with an object having a weight and at least one leg that supports the object above a foundation, the monitoring system comprising:
a combination of a frame, a mechanical connector securable to the leg of the object, a load cell mechanically coupled to each of the frame and the mechanical connector, and a threaded bolt adjustably positioned with respect to and interconnected to the combination;
in which the combination is configured to be securable to the foundation by at least one fixed anchor, and the monitoring system is configured such that rotation of the threaded bolt correspondingly lifts the object leg and applies a load of the leg to the load cell; and
in which the object leg has a bottom, the frame is configured to be securable to the foundation adjacent the object leg, and the load cell has upper and lower ends such that the load cell is operatively positioned to have the weight of the object applied to the lower end of the load cell; in which the monitoring system suspends the bottom of the object leg at an elevation below the load cell.

22. The monitoring system of claim 21, in which the combination is configured to be secured to at least one of the foundation and the leg of the object prior to rotating the threaded bolt.

23. The monitoring system of claim 21, in which the load cell has upper and lower ends, and the upper end of the load cell is moveably mounted to the frame to allow the load cell to be raised and lowered relative to the frame.

* * * * *